United States Patent
Islam et al.

(10) Patent No.: US 12,498,462 B2
(45) Date of Patent: Dec. 16, 2025

(54) LiDAR ARRAY WITH VERTICALLY-COUPLED TRANSCEIVERS

(71) Applicant: APPLE INC., Cupertino, CA (US)

(72) Inventors: Nurul Taimur Islam, Cupertino, CA (US); Malcolm J. Northcott, Santa Cruz, CA (US); Christopher M. Rogers, Palo Alto, CA (US); Helen H. Liang, Los Gatos, CA (US); Ehsan Shah-Hosseini, San Francisco, CA (US); Jack E. Graves, Sunnyvale, CA (US); Ariel Lipson, Tel Aviv (IL); Daniel Kravitz, Petah Tikva (IL)

(73) Assignee: Apple Inc., Cupertino, CA (US)

( * ) Notice: Subject to any disclaimer, the term of this patent is extended or adjusted under 35 U.S.C. 154(b) by 810 days.

(21) Appl. No.: 17/742,419

(22) Filed: May 12, 2022

(65) Prior Publication Data
US 2023/0366986 A1   Nov. 16, 2023

(51) Int. Cl.
*G01S 7/481* (2006.01)
*G01S 7/499* (2006.01)
(Continued)

(52) U.S. Cl.
CPC .......... *G01S 7/4817* (2013.01); *G01S 7/4815* (2013.01); *G01S 7/4816* (2013.01); *G01S 7/4818* (2013.01);
(Continued)

(58) Field of Classification Search
CPC .... G01S 7/4817; G01S 7/4815; G01S 7/4816; G01S 7/4818; G01S 7/499; G01S 17/42; G01S 17/89; G02B 26/105; G02B 26/108
See application file for complete search history.

(56) References Cited

U.S. PATENT DOCUMENTS

| 9,529,079 B1 | 12/2016 | Droz et al. |
| 9,971,948 B1 | 5/2018 | Herrington et al. |

(Continued)

FOREIGN PATENT DOCUMENTS

| CN | 109541619 A | 3/2019 |
| CN | 115605774 A | 1/2023 |

(Continued)

OTHER PUBLICATIONS

Ding et al., "Compensation of Laser Frequency Tuning Nonlinearity of a Long Range OFDR Using Deskew Filter," Optics Express, vol. 21, No. 3, pp. 3826-3834, Feb. 11, 2013.

(Continued)

*Primary Examiner* — Dominic J Bologna
(74) *Attorney, Agent, or Firm* — Meitar Patents Ltd.; Daniel Kligler (57) ABSTRACT

An optical sensing device includes a planar substrate and an array of optical transceivers disposed on the planar substrate. Each optical transceiver includes a photodetector, at least one turning mirror having a reflective surface disposed diagonally relative to the substrate, and multiple waveguides disposed parallel to the substrate. The waveguides include a transmit waveguide, which is coupled to convey outgoing light from a coherent light source to the at least one turning mirror for output from the optical transceiver, and a receive waveguide, which is coupled to receive incoming light reflected by the at least one turning mirror and to convey the incoming light to the photodetector.

18 Claims, 5 Drawing Sheets

(51) Int. Cl.
   *G01S 17/42* (2006.01)
   *G01S 17/89* (2020.01)
   *G02B 26/10* (2006.01)
(52) U.S. Cl.
   CPC .............. *G01S 7/499* (2013.01); *G01S 17/42* (2013.01); *G01S 17/89* (2013.01); *G02B 26/105* (2013.01); *G02B 26/108* (2013.01)

(56) References Cited

U.S. PATENT DOCUMENTS

| | | | |
|---|---|---|---|
| 10,018,723 | B2 | 7/2018 | Sromin et al. |
| 2017/0285325 | A1 | 10/2017 | Erlich et al. |
| 2019/0025426 | A1 | 1/2019 | Satyan et al. |
| 2020/0209361 | A1* | 7/2020 | Maier .................. G01S 7/4817 |
| 2020/0234785 | A1 | 7/2020 | Kyselov et al. |
| 2021/0257396 | A1 | 8/2021 | Piggott et al. |
| 2021/0311194 | A1 | 10/2021 | Boloorian |
| 2021/0314734 | A1 | 10/2021 | Mehta et al. |
| 2021/0341611 | A1 | 11/2021 | Boloorian |
| 2021/0373350 | A1* | 12/2021 | Oda ..................... H01S 5/4012 |
| 2021/0382153 | A1 | 12/2021 | Dielacher et al. |
| 2021/0405164 | A1 | 12/2021 | Klemme et al. |
| 2022/0043108 | A1 | 2/2022 | Lavian |
| 2022/0050201 | A1 | 2/2022 | Sun et al. |
| 2022/0075076 | A1 | 3/2022 | Michaels et al. |
| 2022/0091242 | A1 | 3/2022 | Gagne et al. |
| 2022/0113379 | A1 | 4/2022 | Viswanatha et al. |
| 2022/0404475 | A1 | 12/2022 | Laflaquiere et al. |
| 2024/0069285 | A1* | 2/2024 | Hajati .................. G02B 6/2861 |
| 2024/0369689 | A1* | 11/2024 | Hajati .................. G01S 7/4817 |
| 2025/0116763 | A1* | 4/2025 | Spollard ................. G01S 17/32 |

FOREIGN PATENT DOCUMENTS

| | | |
|---|---|---|
| CN | 115932888 A | 4/2023 |
| DE | 102020213161 A1 | 4/2022 |
| EP | 3961257 A1 | 3/2022 |
| EP | 3971614 A1 | 3/2022 |
| ES | 2896302 T3 | 2/2022 |
| WO | 2018102190 A1 | 6/2018 |
| WO | 2020161260 A1 | 8/2020 |
| WO | 2020190338 A1 | 9/2020 |
| WO | 2022168500 A1 | 8/2022 |
| WO | 2023012527 A1 | 2/2023 |

OTHER PUBLICATIONS

Du et al., "Method for Improving Spatial Resolution and Amplitude by Optimized Deskew Filter in Long-Range OFDR," IEEE Photonics Journal, vol. 6, No. 5, pp. 1-13, Oct. 2014.
Sandborn, "FMCW Lidar: Scaling to the Chip-Level and Improving Phase-Noise-Limited Performance," Dissertation, Electrical Engineering and Computer Sciences, University of California at Berkeley, USA, pp. 1-90, Dec. 1, 2019.
Meta et al., "Signal Processing for FMCW SAR," IEEE Transactions on Geoscience and Remote Sensing, voume 45, No. 11, pp. 3519-3532, Nov. 2007.
Peek, "Estimation and Compensation of Frequency Sweep Nonlinearity in FMCW Radar," M.Sc. thesis in Applied Mathematics, The University of Twente, The Netherlands, pp. 1-67, Sep. 2011.
Meta et al., "Range Non-Linearities Correction in FMCW SAR," IEEE, pp. 403-406, year 2006.
Baumann et al., "Speckle Phase Noise in Coherent Laser Ranging: Fundamental Precision Limitations," Optics Letters, vol. 39, issue 16, pp. 4776-4779, Aug. 15, 2014.
Islam et al., U.S. Appl. No. 17/577,039, filed Jan. 17, 2022.
Cohen, U.S. Appl. No. 17/838,217, filed Jun. 12, 2022.
Islam et al., U.S. Appl. No. 17/863,419, filed Jul. 13, 2022.
Kendrisic et al., "Thermally Tuned VCSEL-Based SS-OCT System," Biophotonics Congress: Biomedical Optics (Translational, Microscopy, OCT, OTS, Brain), Optica Publishing Group, pp. 1-2, year 2022.
Axelrod et al., "Reconfigurabe Quasi-Resonance Scanner for 3D FMCW Imaging," Optics Letters, vol. 39, issue 16, pp. 4776-4779, year 2014.
Northcott et al., U.S. Appl. No. 18/094,999, filed Jan. 10, 2023.
Shnaiderman et al., U.S. Appl. No. 18/094,997, filed Jan. 10, 2023.
Shnaiderman et al., U.S. Appl. No. 18/314,843, filed May 10, 2023.
Oggier et al., U.S. Appl. No. 18/113,104, filed Feb. 23, 2023.
Kamali et al., "A review of dielectric optical metasurfaces for wavefront control," Nanophotonics, Open Access, pp. 1-84, May 18, 2018.
Xiong et al., "Controlling the degrees of freedom in metasurface designs for multi-functional optical devices," Nanoscale Advances, vol. 1, pp. 3786-3806, year 2019.
Wikipedia, "Laser speckle contrast imaging," pp. 1-8, last edited Dec. 12, 2023.
Li et al., "Transmissive-detected laser speckle contrast imaging for blood flow monitoring in thick tissue: ," from Monte Carlo simulation to experimental demonstration, Nature, Light: Science & Applications, vol. 10, article No. 241, pp. 1-43, Dec. 3, 2021.
Heeman et al., "Clinical applications of laser speckle contrast imaging: a review," Journal of Biomedical Optics, vol. 24, No. 8, pp. 080901-1-80901-11, Aug. 2019.
Zalevsky et al., "Simultaneous remote extraction of multiple speech sources and heart beats from secondary speckles pattern," Optics Express, vol. 17, No. 24, pp. 1-15, Nov. 23, 2009.
Wang, "Investigation of New Concepts and Solutions for Silicon Nanophotonics," Doctoral Thesis in Microelectronics and Applied Physics, Stockholm, Sweden, pp. 1-91, year 2010.
Sacher et al., "Wide Bandwidth and High Coupling Efficiency Si3N4-on-SOI Dual-level Grating Coupler," Optics Express, vol. 22, No. 9, pp. 1-10, May 5, 2014.
Rogers et al., "A Universal 3D Imaging Sensor on a Silicon Photonics Platform," ArXiv:2008.02411v3, pp. 1-18, Nov. 11, 2020.
Lumerical Inc., "Tutorial—Splitter Optimization," pp. 1-8, year 2019, as downloaded from https://lumopt.readthedocs.io/en/latest/tutorial.html.
Nicolaescu et al., "3D Imaging via Silicon-photonics-based LIDAR," Proc. SPIE vol. 11691, Silicon Photonics XVI, pp. 1-12, year 2021.
Marchetti et al., "Coupling Strategies for Silicon Photonics Integrated Chips [Invited]," Photonics Reseach, vol. 7, No. 2, pp. 1-39, Feb. 2019.
Marchetti et al., "High-efficiency Grating-couplers: Demonstration of a New Design Strategy," Springer Nature, Scientific Reports, vol. 7, pp. 1-9, Nov. 2017.
Hooten et al., "Inverse Design of Grating Couplers Using the Policy Gradient Method from Reinforcement Learning," De Gruyter, Nanophotonics, vol. 10, issue 15, pp. 3843-3856, year 2021.
Michaels, "A Hierarchical Approach to the Design and Optimization of Photonics," PhD Thesis, University of California, Berkeley, pp. 1-139, year 2019.
Molesky, "Outlook for Inverse Design in Nanophotonics," arXiv:1801.06715v1, pp. 1-13, Jan. 20, 2018.
International Application # PCT/US2023/066803 Search Report dated Jul. 27, 2023.
Vasilyev, "The Optoelectronic Swept-Frequency Laser and Its Applications in Ranging, Three-Dimensional Imaging, and Coherent Beam Combining of Chirped-Seed Amplifiers," Doctoral Thesis, California Institute of Technology, pp. 1-177, year 2013.
International Application # PCT/US2023/084979 Search Report dated Mar. 12, 2024.
Huang, Frequency-modulated continuous-wave 3D imaging with high photon efficiency Huang, Jul. 12, 2022, vol. 47, pp. 3568-3571.
Japanese Office Action, Application # 2024-115446, dated Oct. 14, 2025.
Non-Final Office Action for Application # U.S. Appl. No. 17/863,419, dated Aug. 12, 2025.

\* cited by examiner

LiDAR ARRAY WITH VERTICALLY-COUPLED TRANSCEIVERS

FIELD OF THE INVENTION

The present invention relates generally to systems and methods for optical sensing, and particularly to LiDAR sensing.

BACKGROUND

LiDAR (Light Detection And Ranging) apparatuses, used for ranging applications, emit one or more beams of optical radiation toward a target scene, and determine the range to the scene by analyzing the properties of the beams reflected back from the scene to the LiDAR device. In a scanning LiDAR, a scanner, such as a gimballed mirror or a rotating polygon mirror, is used to scan the beams of the LiDAR over a target scene, thus mapping the range across the target scene. Some LiDAR systems use arrays of optical transmitters and receivers to measure the ranges of multiple points in the scene simultaneously.

In some LiDAR sensing arrangements, such as frequency-modulated continuous-wave (FMCW) LiDAR, a radio-frequency (RF) chirp is applied to modulate the frequency of the beam of light (typically a coherent, single-mode laser beam) that is directed toward the target scene. The light reflected from the target scene is mixed with a sample of the transmitted light (referred to as the local beam or local oscillator) and detected by a photodetector, such as a balanced photodiode pair. The photodetector outputs an RF signal at a beat frequency that is proportional to the distance to the target. When the target is moving, the resulting Doppler shift of the reflected light will cause the beat frequency to increase or decrease, depending on the direction of motion. By comparing the beat frequencies obtained from chirps of positive and negative slopes, it is thus possible to extract both the range and the radial velocity of the target.

In a time-of-flight (ToF) LiDAR sensing arrangement, short pulses are emitted by the LiDAR device toward the target scene. The range to the target scene is determined by analyzing the round-trip time of each pulse from the LiDAR system to the target scene and back.

The terms "optical radiation" and "light," as used in the present description and in the claims, refer generally to any and all of visible, infrared, ultraviolet, and extreme ultraviolet radiation.

SUMMARY

Embodiments of the present invention that are described hereinbelow provide improved methods and devices for LiDAR sensing.

There is therefore provided, in accordance with an embodiment of the invention, an optical sensing device, including a planar substrate and an array of optical transceivers disposed on the planar substrate. Each optical transceiver includes a photodetector, at least one turning mirror having a reflective surface disposed diagonally relative to the substrate, and multiple waveguides disposed parallel to the substrate. The multiple waveguides include a transmit waveguide, which is coupled to convey outgoing light from a coherent light source to the at least one turning mirror for output from the optical transceiver, and a receive waveguide, which is coupled to receive incoming light reflected by the at least one turning mirror and to convey the incoming light to the photodetector.

In a disclosed embodiment, the at least one turning mirror includes a right-angle prism disposed on the substrate.

Additionally or alternatively, the photodetector includes a balanced pair of photodiodes, and wherein each optical transceiver includes a splitter coupled to divide the light received through the receive waveguide between the photodiodes.

In some embodiments, each optical transceiver includes a splitter coupled to split off a fraction of the coherent light received by the transmit waveguide, and a mixer which is coupled to mix the fraction of the coherent light with the incoming light received through the receive waveguide for input to the photodetector. In one embodiment, the device includes a quarter-wave plate, which is configured to rotate a polarization of both the outgoing and the incoming light that is reflected from the at least one turning mirror, and each optical transceiver includes a polarization rotator, which is coupled to rotate the polarization of the incoming light in the receive waveguide.

Additionally or alternatively, the waveguides include at least one spot size converter, which is configured to reduce a mode diameter of the outgoing light before incidence of the outgoing light on the at least one turning mirror. In a disclosed embodiment, the at least one spot size converter includes a tapered waveguide. Additionally or alternatively, the device includes at least one lens, which is configured to collimate the outgoing light following reflection from the at least one turning mirror and to focus the incoming light before reflection via the at least one turning mirror into the receive waveguide.

In some embodiments, the optical transceivers are configured for bistatic operation. In one embodiment, the at least one turning mirror includes a transmit mirror coupled to reflect the outgoing light from the transmit waveguide and a receive mirror coupled to reflect the incoming light into the receive waveguide. Alternatively, the at least one turning mirror includes a single mirror coupled both to reflect the outgoing light from the transmit waveguide and to reflect the incoming light into the receive waveguide.

In other embodiments, the optical transceivers are configured for monostatic operation, and the at least one turning mirror includes a single turning mirror coupled both to reflect the outgoing light from the transmit waveguide and to reflect the incoming light into the receive waveguide. In a disclosed embodiment, the waveguides in each optical transceiver include a bidirectional waveguide coupled to the single turning mirror, and each optical transceiver includes a directional splitter, which is coupled to convey the outgoing light from the transmit waveguide into the bidirectional waveguide for output to the turning mirror and to convey the incoming light received in the bidirectional waveguide from the turning mirror to the receive waveguide.

There is also provided, in accordance with an embodiment of the invention, LiDAR apparatus, including a device as described above and optics configured to collimate the outgoing light that has been reflected from the at least one turning mirror and to focus the incoming light toward the turning mirror for input to the receive waveguide. Processing and control circuits are configured to process the signals output by the optical transceivers.

There is additionally provided, in accordance with an embodiment of the invention, a method for producing an optical sensing device. The method includes forming an array of optical transceivers on a planar substrate. Each optical transceiver includes a photodetector, at least one turning mirror having a reflective surface disposed diagonally relative to the substrate, and multiple waveguides disposed parallel to the substrate. The multiple waveguides include a transmit waveguide, which is coupled to convey outgoing light from a coherent light source to the at least one turning mirror for output from the optical transceiver, and a receive waveguide, which is coupled to receive incoming light reflected by the at least one turning mirror and to convey the incoming light to the photodetector.

The present invention will be more fully understood from the following detailed description of the embodiments thereof, taken together with the drawings in which:

DETAILED DESCRIPTION OF EMBODIMENTS

LiDAR systems transmit optical radiation toward a target scene and receive light reflected from the scene. In monostatic LiDAR, the same optical channel is used for both transmission and reception of light, whereas bistatic LiDAR uses separate transmit and receive channels. A multi-channel LiDAR comprises an array of multiple transmitter/receiver pairs (also referred to as optical transceivers, or as pixels in the array), in either a monostatic or bistatic configuration. Multi-channel arrays of this sort are advantageous in being able to sample and sense the range of multiple points in the target scene simultaneously, thus enabling the LiDAR system to construct depth maps with enhanced resolution and reduced reliance on fast scanning to cover the area of the target scene.

Photonic integrated circuits (PICs) enable the miniaturization of the optical components of a LiDAR transceiver array and thus can achieve a high channel density while maintaining a small device footprint. The transmit (Tx) and receive (Rx) channels of each transceiver are realized in a PIC using respective Tx and Rx waveguides for output and input of light. In current PIC technologies, these waveguides are produced by photolithographic techniques and typically run parallel to the planar substrate of the PIC. One of the challenges in the design of optical transceiver arrays is to couple light out of and into the waveguides efficiently and precisely.

Embodiments of the present invention that are described herein address these challenges using turning mirrors within an array of optical transceivers on a PIC. The turning mirrors have reflective surfaces that are disposed diagonally relative to the planar substrate on which the array is formed. In the disclosed embodiments, each optical transceiver in the array comprises a transmit waveguide, which conveys outgoing light from a coherent light source to a turning mirror for output from the optical transceiver, and a receive waveguide, which receives incoming light reflected by a turning mirror and conveys the incoming light to the photodetector. In monostatic configurations, each optical transceiver comprises a single turning mirror for both transmission and reception; whereas bistatic configurations may have separate transmit and receive mirrors.

In some embodiments, the waveguides in each optical transceiver comprise a spot size converter, such as a tapered waveguide, which adjusts the beam diameter and numerical aperture of the outgoing light before incidence of the outgoing light on the turning mirror. In combination with a matched collimating lens, which is mounted above the substrate, this arrangement is useful in providing a well-collimated beam while reducing the intensity of undesired back-reflections into the waveguide. Specifically, the tapered waveguide reduces back-reflections because it enables the index contrast to be made smaller by tapering down the silicon or using silicon nitride, which has even smaller index contrast. Back-reflections can be reduced further by using index-matching gel between the taper and the mirror and/or by using suspended edge couplers, which cause lower Fresnel reflection. Back-reflections can also be reduced by dicing the edge coupler at an angle, or creating a horizontal tilt, or by angling the waveguides relative to the output facet of the PIC, for example by about 8°.

Figure 1:
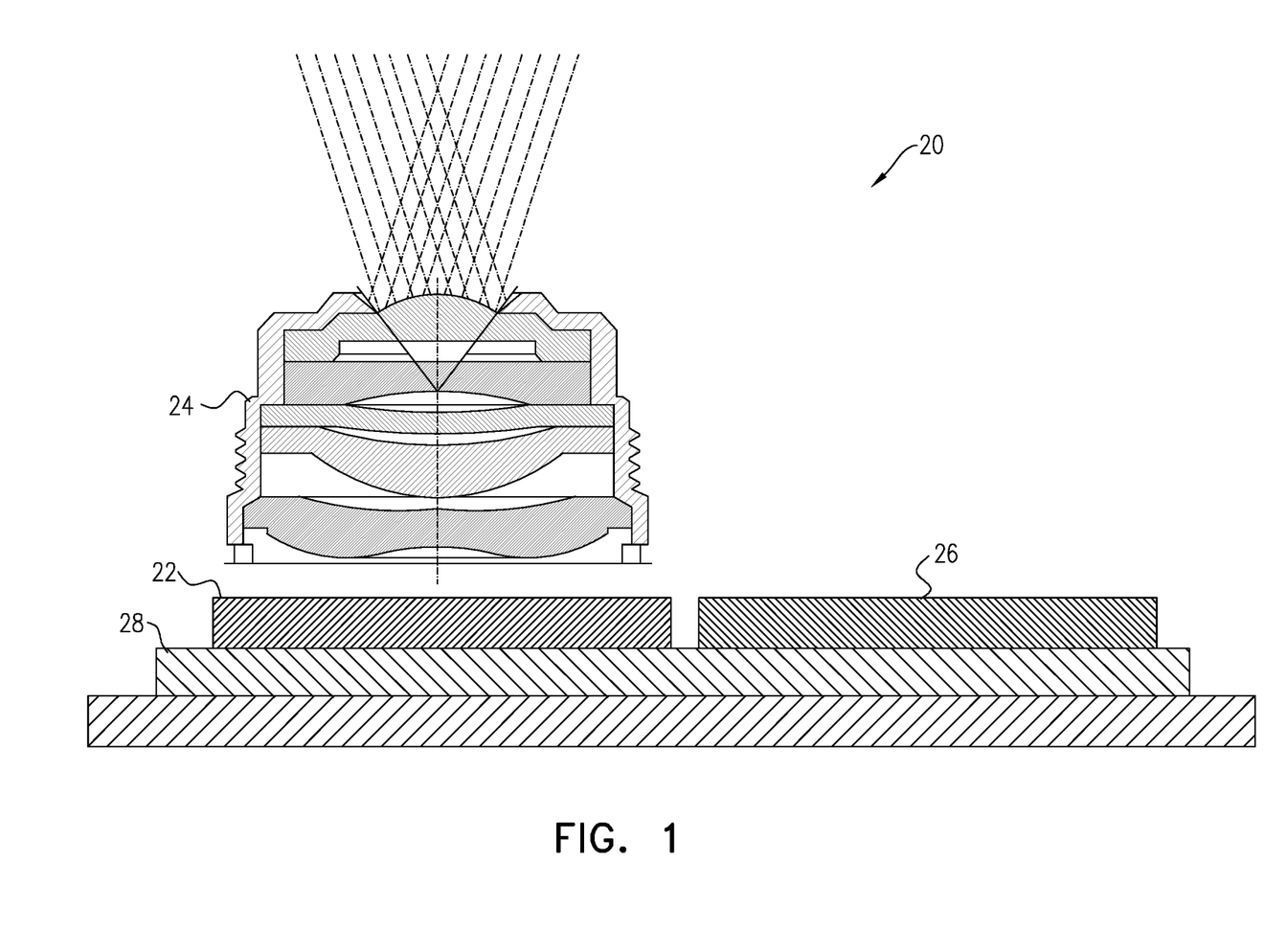
FIG. 1 is a schematic sectional view of a LiDAR apparatus, in accordance with an embodiment of the invention.

FIG. 1 is a schematic sectional view of a LiDAR apparatus 20, in accordance with an embodiment of the invention. Apparatus 20 comprises an optical sensing device in the form of a PIC 22, on which an array of optical transceivers is formed, as detailed below. Optics 24 collimate the outgoing light from PIC 22 and focus incoming light into the PIC. PIC 22 is mounted on a sub-mount substrate, such as an interposer 28, and is connected by electrical traces (not shown) on interposer 28 to electronic processing and control circuits 26. Alternatively, at least some of the electronic processing and control circuits may be implemented on the PIC itself. Typically, circuits 26 comprise RF analog circuits and depth processing logic, which processes the signals output by the optical transceivers on PIC 22 to produce a depth map of a target scene.

Figure 2:
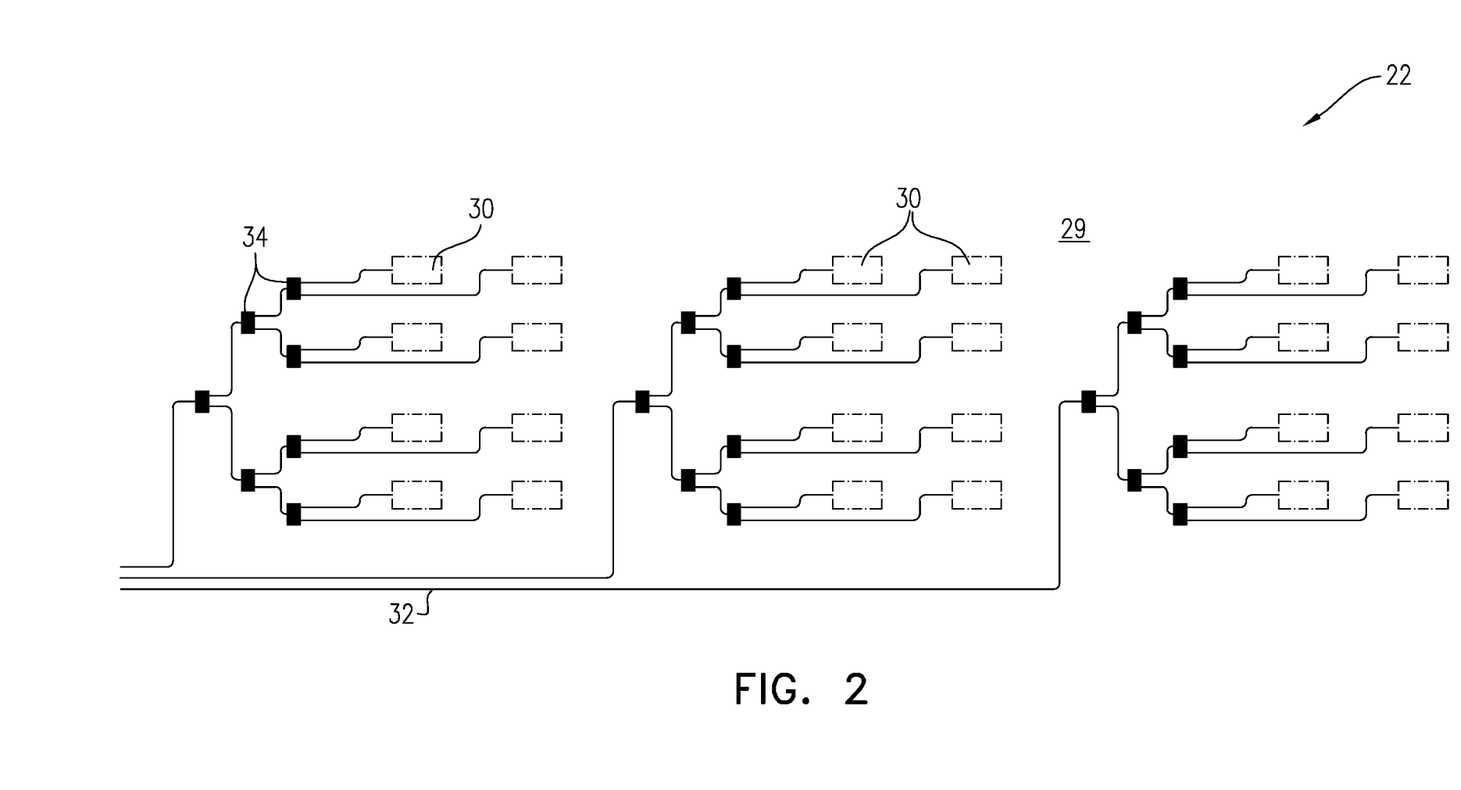
FIG. 2 is a schematic top view of an optical transceiver array for use in LiDAR sensing, in accordance with an embodiment of the invention.

FIG. 2 is a schematic top view of a part of an array of optical transceivers 30 on PIC 22, in accordance with an embodiment of the invention. PIC 22 comprises a substrate 29, such as a Silicon-On-Insulator (SOI) substrate, on which transceivers 30 are formed by processes of film deposition and photolithography that are known in the art. Waveguides 32 on PIC 29 convey laser radiation from a coherent light source, such as a frequency-modulated high-power laser source (not shown), for example with output power in the range of 10 mW to 1 W, depending on the desired detection range. Optical splitters 34 divide the laser radiation among transceivers 30. The splitters may be passive when all transceivers operate in parallel or active in order to selectively operate individual transceivers or groups of transceivers. Each optical transceiver 30 comprises a photodetector for sensing the received light, as described further hereinbelow.

Figure 3:
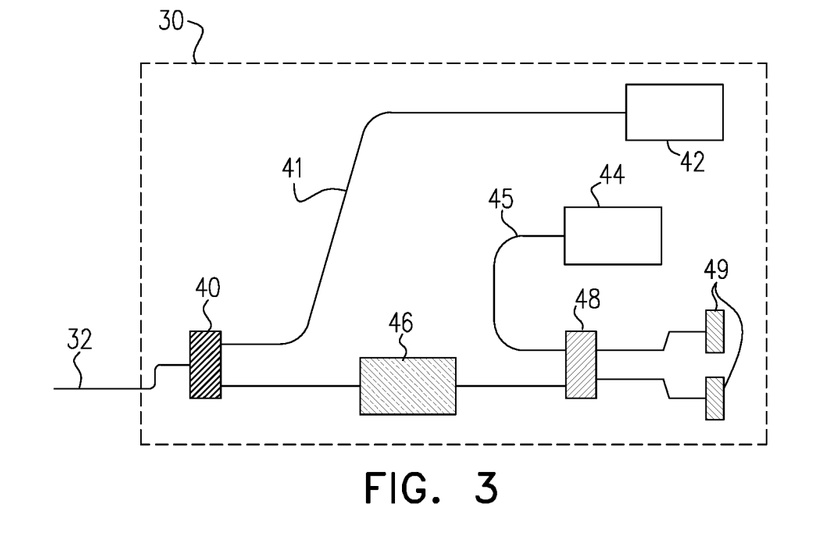
FIG. 3 is a schematic top view of an optical transceiver in an array, in accordance with an embodiment of the invention.
Figure 4:
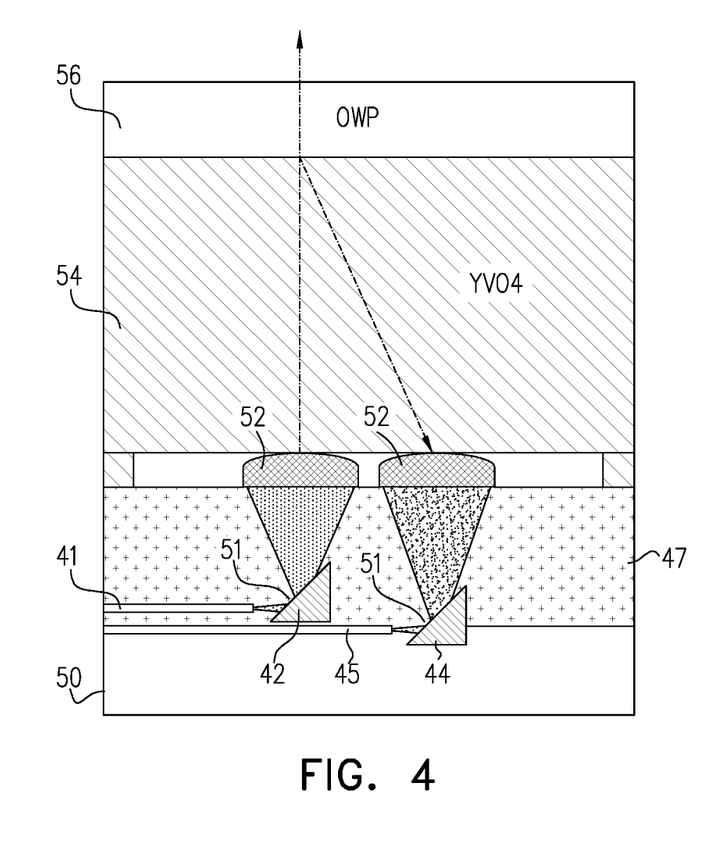
FIG. 4 is a schematic sectional view of a part of an optical transceiver in an array, in accordance with an embodiment of the invention.

Reference is now made to FIGS. 3 and 4, which schematically illustrate one of optical transceivers 30 in the array on PIC 22, in accordance with an embodiment of the invention. FIG. 3 is a top view of the transceiver, while FIG. 4 is a sectional view of a part of the transceiver. In this embodiment, transceivers 30 are configured for bistatic operation.

An input splitter 40 divides the incoming radiation from waveguide 32 between a transmit waveguide 41 and a local oscillator waveguide 43, typically in uneven proportions (for example, 90%/10%). Waveguides 41 and 43, as well as the other waveguides in transceiver 30, typically comprise silicon or silicon nitride waveguide cores surrounded by a dielectric cladding 47, such as $SiO_2$. The waveguides are formed on a planar silicon substrate 50 and run parallel to the substrate. Transmit waveguide 41 conveys the outgoing light to a turning mirror 42 for output from the optical transceiver in a direction normal to substrate 50, by reflection from a diagonal surface 51 of the turning mirror. The normal direction of the output may either be upward relative to the substrate, as illustrated in the figures, or downward through the substrate, depending on application requirements.

Figure 7:
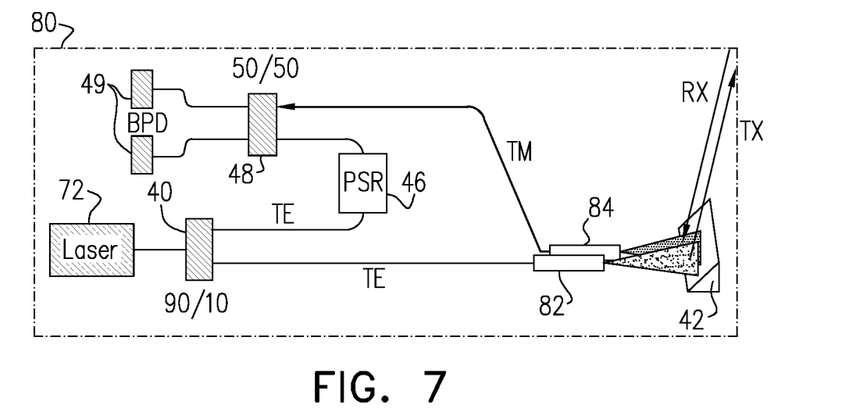
FIG. 7 is a schematic top view of an optical transceiver in an array, in accordance with an alternative embodiment of the invention.
Figure 8:
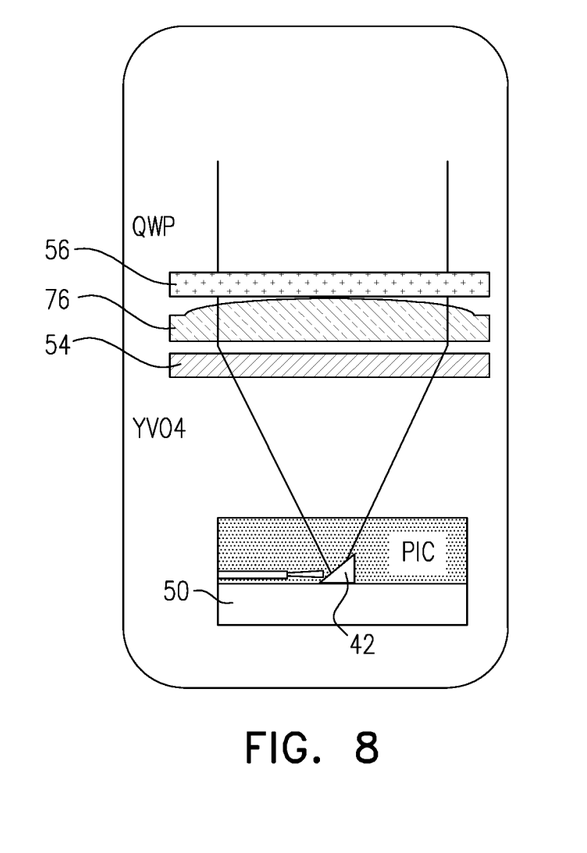
FIG. 8 is a schematic sectional view of a part of an optical transceiver in an array, in accordance with an alternative embodiment of the invention.

Another turning mirror 44 reflects incoming light into a receive waveguide 45. As shown in FIG. 4, a pair of microlenses 52 collimate the outgoing light from waveguide 41 following reflection turning mirror 42 and focus incoming light before reflection via turning mirror 44 into receive waveguide 45. A quarter-wave plate (QWP) 56 rotates the polarizations of both the outgoing and the incoming light, so that the polarization of the incoming light is ultimately rotated by 90° relative to the light in the outgoing beam. (The QWP is useful in increasing the optical signal received from specular surfaces, which preserve polarization, but may not be needed in other cases, since diffuse reflectors tend to depolarize the incident light.) A birefringent crystal 54, such as a layer of $YVO_4$, differentially deflects the two polarizations so as to align the axes of the outgoing and incoming light for each transceiver 30 as the light propagates to and from the target scene. (In an alternative embodiment, as shown in FIGS. 7 and 8, a bistatic transceiver cell can be implemented using a single mirror and lens, without using microlenses.)

Referring back to FIG. 3, the photodetector in this embodiment comprises a balanced pair of photodiodes 49, for example silicon or germanium photodiodes formed on substrate 50. A polarization splitter/rotator (PSR) 46 rotates the polarization of the light in waveguide 43 to match that of the light in receive waveguide 45. A splitter 48 mixes the received light with the local oscillator beam from PSR 46 and splits the mixed light between the pair of photodiodes 49. The outputs of photodiodes 49 are amplified and conveyed to processing and control circuits 26 (FIG. 1) for processing. For FMCW LiDAR applications, for example, the processing circuits extract beat signals from the photodiode outputs and thus estimate the range and velocity of the respective point in the target scene on which the outgoing beam from each transceiver 30 is incident.

Figure 5:
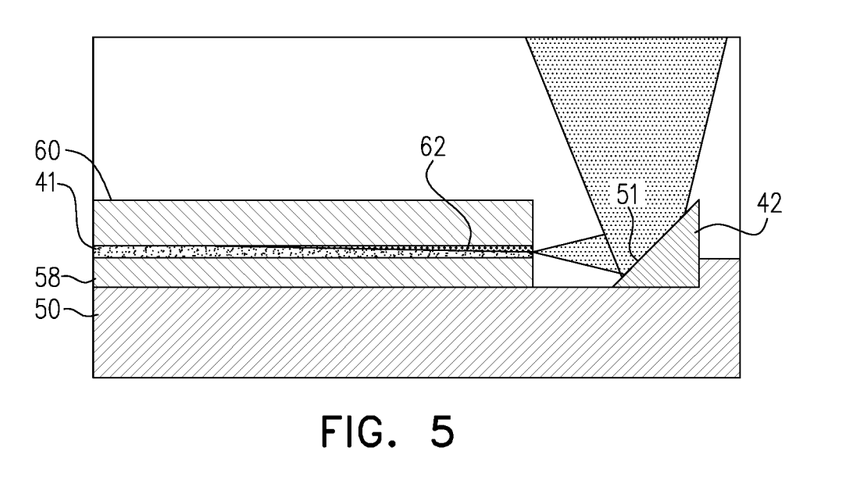
FIG. 5 is a schematic sectional detail view of an output coupling arrangement in an optical transceiver, in accordance with an embodiment of the invention.

FIG. 5 is a schematic sectional detail view of an output coupling arrangement in optical transceiver 30, in accordance with an embodiment of the invention. For the sake of simplicity, this figure shows only the outgoing beam transmitted from transmit waveguide 41. Incoming light may be received into receive waveguide 45 using a similar arrangement.

Turning mirror 42 in this embodiment comprises a right-angle prism, which is mounted on substrate 50. The prism can be made from any suitable material and typically has a high-reflection metal or dielectric coating on reflective surface 51. Alternatively, turning mirror 42 may be produced by etching a silicon layer on a diagonal so that the light from waveguide 41 is deflected by total internal reflection within the silicon.

Transmit waveguide 41 comprises a silicon or silicon nitride waveguide core, which is contained between dielectric layers 58 and 60. Layers 58 and 60 typically comprise $SiO_2$, and are commonly referred to as the "bottom oxide" and "top oxide" layers, respectively. Transmit waveguide 41 terminates in a tapered waveguide 62, which serves as a spot-size converter to adjust the mode diameter and numerical aperture of the outgoing beam before it is incident on turning mirror 42. (Although the waveguide has a vertical taper in FIG. 5, the waveguide may alternatively or additionally be tapered horizontally.) Lens 52 (FIG. 4) collimates the outgoing light following reflection from turning mirror 42. The small mode diameter at the output from tapered waveguide 62 facilitates good focusing and collimation of the beam. Furthermore, back-reflections from lens 52 and from other optical surfaces above PIC 22 in apparatus 20 (FIG. 1) will not be mode-matched to waveguide 62, thus reducing the effect of such back-reflections on the optical circuits in transceiver 30.

Figure 6:
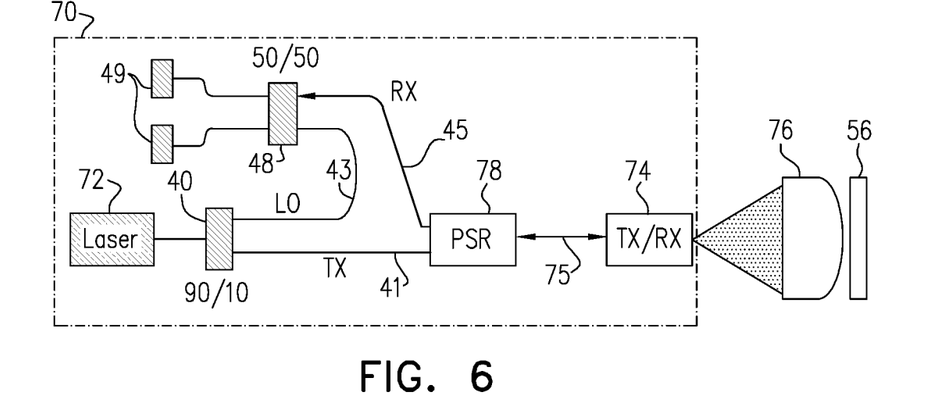
FIG. 6 is a schematic top view of an optical transceiver in an array, in accordance with another embodiment of the invention.

FIG. 6 is a schematic top view of an optical transceiver 70, in accordance with another embodiment of the invention. Transceiver 70 is configured for monostatic operation and may be used in an array, such as in PIC 22 (FIGS. 1 and 2) in place of transceiver 30. Except as described hereinbelow, the operation of transceiver 70 is similar to that of transceiver 30, and like components are labeled with the same indicator numbers.

In transceiver 70, a single turning mirror 74 is coupled both to reflect the outgoing light from transmit waveguide 41 and to reflect the incoming light into receive waveguide 45. Mirror 74 may be fabricated using any of the techniques described above with respect to mirror 42, and may likewise be coupled to the optical circuits in transceiver 70 by a suitable spot-size converter, such as a tapered waveguide. A lens 76 both collimates the outgoing beam following reflection from mirror 74 and focuses the incoming light toward mirror 74 into transceiver 70.

A laser 72 generates the outgoing beam for transmission from optical transceiver 70. (Alternatively, the laser source may be external to the transceiver array, as in the embodiment of FIG. 2.) The outgoing beam and incoming light are coupled to and from turning mirror 74 by a bidirectional waveguide 75. A directional splitter 78 conveys the outgoing light from transmit waveguide 41 into bidirectional waveguide 75 for output to turning mirror 74 and conveys the incoming light received in bidirectional waveguide 75 from turning mirror 74 to receive waveguide 45. In the pictured example, directional splitter 78 comprises a PSR, which operates in conjunction with QWP 56 to separate the incoming light from the orthogonally polarized outgoing light.

As in the preceding embodiment, splitter 48 mixes the received light from waveguide 45 with the local oscillator beam from waveguide 43, and splits the mixed light between a balanced pair of photodiodes 49.

Reference is now made to FIGS. 7 and 8, which schematically illustrate an optical transceiver 80, in accordance with an alternative embodiment of the invention. FIG. 7 is a top view of the transceiver, while FIG. 8 is a sectional view of a part of the transceiver. Transceiver 80 is configured for bistatic operation and may be used in PIC 22 in place of transceiver 30. Except as described hereinbelow, the operation of transceiver 80 is similar to that of transceivers 30 and 70, and like components are labeled with the same indicator numbers.

In transceiver 80, a transmit edge coupler 82 and a receive edge coupler 84 are positioned in mutual proximity, so that both the outgoing and incoming beams are reflected from the same turning mirror 42. Birefringent crystal 54 differentially deflects the transmit and receive polarizations so as to align the axes of the outgoing and incoming beams. Both beams share the same lens 76.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. An optical sensing device, comprising:
a planar substrate; and
an array of optical transceivers disposed on the planar substrate, each optical transceiver comprising:
a photodetector;
at least one turning mirror having a reflective surface disposed diagonally relative to the substrate;
multiple waveguides disposed parallel to the substrate and comprising:
a transmit waveguide, which is coupled to convey outgoing light from a coherent light source to the at least one turning mirror for output from the optical transceiver; and
a receive waveguide, which is coupled to receive incoming light reflected by the at least one turning mirror and to convey the incoming light to the photodetector;
a splitter coupled to split off a fraction of the outgoing light received by the transmit waveguide; and
a mixer which is coupled to mix the fraction of the outgoing light with the incoming light received through the receive waveguide for input to the photodetector.

2. The device according to claim 1, wherein the at least one turning mirror comprises a right-angle prism disposed on the substrate.

3. The device according to claim 1, wherein the photodetector comprises a balanced pair of photodiodes, and wherein each optical transceiver comprises a splitter coupled to divide the light received through the receive waveguide between the photodiodes.

4. The device according to claim 1, wherein the device comprises a quarter-wave plate, which is configured to rotate a polarization of both the outgoing and the incoming light that is reflected from the at least one turning mirror, and wherein each optical transceiver comprises a polarization rotator, which is coupled to rotate the polarization of the incoming light in the receive waveguide.

5. An optical sensing device, comprising:
a planar substrate; and
an array of optical transceivers disposed on the planar substrate, each optical transceiver comprising:
a photodetector;
at least one turning mirror having a reflective surface disposed diagonally relative to the substrate; and
multiple waveguides disposed parallel to the substrate and comprising:
a transmit waveguide, which is coupled to convey outgoing light from a coherent light source to the at least one turning mirror for output from the optical transceiver; and
a receive waveguide, which is coupled to receive incoming light reflected by the at least one turning mirror and to convey the incoming light to the photodetector,
wherein the waveguides comprise at least one spot size converter, which is configured to reduce a mode diameter of the outgoing light before incidence of the outgoing light on the at least one turning mirror.

6. The device according to claim 5, wherein the at least one spot size converter comprises a tapered waveguide.

7. The device according to claim 5, and comprising at least one lens, which is configured to collimate the outgoing light following reflection from the at least one turning mirror and to focus the incoming light before reflection via the at least one turning mirror into the receive waveguide.

8. An optical sensing device, comprising:
a planar substrate; and
an array of optical transceivers disposed on the planar substrate, each optical transceiver comprising:
a photodetector;
at least one turning mirror having a reflective surface disposed diagonally relative to the substrate; and
multiple waveguides disposed parallel to the substrate and comprising:
a transmit waveguide, which is coupled to convey outgoing light from a coherent light source to the at least one turning mirror for output from the optical transceiver; and
a receive waveguide, which is coupled to receive incoming light reflected by the at least one turning mirror and to convey the incoming light to the photodetector,
wherein the optical transceivers are configured for bistatic operation.

9. The device according to claim 8, wherein the at least one turning mirror comprises a transmit mirror coupled to reflect the outgoing light from the transmit waveguide and a receive mirror coupled to reflect the incoming light into the receive waveguide.

10. The device according to claim 8, wherein the at least one turning mirror comprises a single mirror coupled both to reflect the outgoing light from the transmit waveguide and to reflect the incoming light into the receive waveguide.

11. The device according to claim 1, wherein the optical transceivers are configured for monostatic operation, and the at least one turning mirror comprises a single turning mirror coupled both to reflect the outgoing light from the transmit waveguide and to reflect the incoming light into the receive waveguide.

12. The device according to claim 11, wherein the waveguides in each optical transceiver comprise a bidirectional waveguide coupled to the single turning mirror, and wherein each optical transceiver comprises a directional splitter, which is coupled to convey the outgoing light from the transmit waveguide into the bidirectional waveguide for output to the turning mirror and to convey the incoming light received in the bidirectional waveguide from the turning mirror to the receive waveguide.

13. LiDAR apparatus, comprising:

the device according to claim 1;

optics configured to collimate the outgoing light that has been reflected from the at least one turning mirror and to focus the incoming light toward the turning mirror for input to the receive waveguide; and processing and control circuits configured to process the signals output by the photodetector.

14. A method for producing an optical sensing device, comprising:

forming an array of optical transceivers on a planar substrate, each optical transceiver comprising:

a photodetector;

at least one turning mirror having a reflective surface disposed diagonally relative to the substrate; and multiple waveguides disposed parallel to the substrate and comprising:

a transmit waveguide, which is coupled to convey outgoing light from a coherent light source to the at least one turning mirror for output from the optical transceiver; and a receive waveguide, which is coupled to receive incoming light reflected by the at least one turning mirror and to convey the incoming light to the photodetector, wherein the waveguides comprise at least one spot size converter, which is configured to reduce a mode diameter of the outgoing light before incidence of the outgoing light on the at least one turning mirror.

15. The method according to claim 14, wherein the at least one turning mirror comprises a right-angle prism disposed on the substrate.

16. The method according to claim 14, wherein the at least one spot size converter comprises a tapered waveguide.

17. The method according to claim 14, wherein forming the array comprises configuring the optical transceivers for monostatic operation.

18. The method according to claim 14, wherein forming the array comprises configuring the optical transceivers for monostatic operation, wherein the at least one turning mirror comprises a single turning mirror coupled both to reflect the outgoing light from the transmit waveguide and to reflect the incoming light into the receive waveguide.

\* \* \* \* \*